April 21, 1959
S. ANDREWS ET AL
2,882,546
END STOP AND RELEASE FOR CONVEYOR SCREW
Filed April 12, 1957
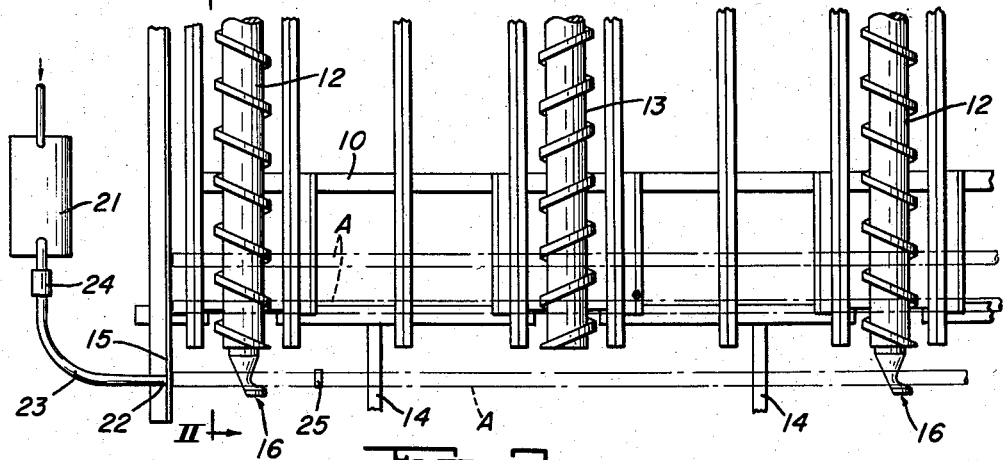
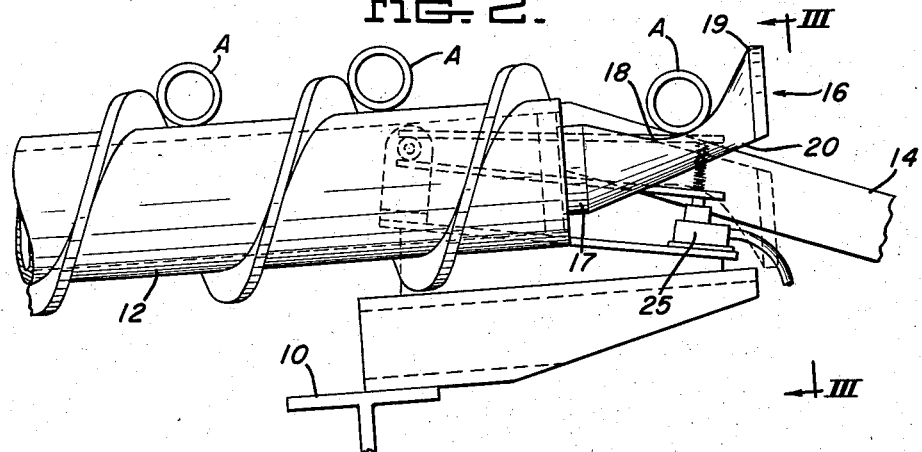
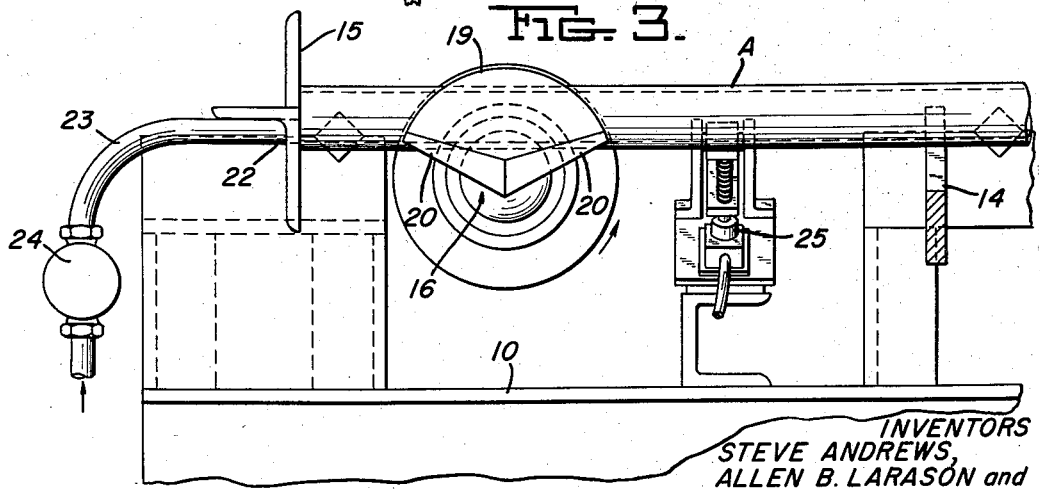
INVENTORS
STEVE ANDREWS,
ALLEN B. LARASON and
FRANK C. SPRAITZAR,
By: Donald G. Dalton
their Attorney

United States Patent Office 2,882,546
Patented Apr. 21, 1959

2,882,546

END STOP AND RELEASE FOR CONVEYOR SCREW

Steve Andrews, Fairless Hills, Pa., Allen B. Larason, Trenton, N.J., and Frank C. Spraitzar, Morrisville, Pa.

Application April 12, 1957, Serial No. 652,549

7 Claims. (Cl. 15—304)

This invention relates to stops for momentarily arresting movement of elongated articles as they leave a screw-type transfer table.

One practical application of our invention is in the manufacture of welded steel pipe for holding each pipe length while an air blast is directed into the bore to remove foreign material, such as loose scale and water. Conventionally after welded pipe lengths have passed through sizing rolls and scale removing rolls, they move across a screw-type transfer table which serves as a cooling bed and where they may also be sawed in half if of double length. They discharge from this table to a series of skids or crossover arms which carry them away for further processing. It is desirable to blow foreign material from inside the pipe lengths just as they move onto the crossover arms. Nevertheless it is apparent the invention is not limited to this particular application, but may be applied wherever analogous problems are encountered.

An object of our invention is to provide an improved stop which momentarily arrests movement of each elongated article of a series discharging from a screw-type transfer table and subsequently releases the article before arrival of the next.

A further object is to provide an improved stop of the foregoing type whose elements are rigid with screws of the transfer table and hence do not entail additional moving parts.

A more specific object is to provide an improved stop which includes a plurality of specially shaped spindles rigid with the ends of selected screws of a transfer table and adapted to hold each article briefly as it leaves the screw and quickly dampen any bouncing and then release the article automatically, enabling them to receive the next article.

As applied to pipe manufacture, a further object is to provide an automatic stop which holds each pipe length long enough for an air blast to be directed into the bore from a stationary blowing device and then releases the pipe length before arrival of the next.

In accomplishing these and other objects of the invention we have provided improved details of structure, a preferred form of which is shown in the accompanying drawings, in which:

Figure 1 is a top plan view of a portion of a transfer table equipped with a stop constructed in accordance with our invention;

Figure 2 is a vertical section on a larger scale on line II—II of Figure 1; and

Figure 3 is a fragmentary front elevational view.

Figure 1 shows a portion of a conventional transfer table which includes a frame 10 and a plurality of upwardly sloping alternating left hand screws 12 and right hand screws 13 journaled to said frame and power driven in opposite directions by any suitable drive means, not shown. Elongated articles A, such as pipe lengths undergoing cooling, move along the screws and discharge from the free ends. Fixed downwardly sloping skids or crossover arms 14 receive the articles as they leave the screws. Frame 10 carries an upright flange 15 outside the outermost screw on the left to prevent longitudinal movement of articles in this direction, and a similar flange not shown at the right.

In accordance with our invention, the left-hand screws 12 each carry respective spindles 16 which are fixed to their free ends and together constitute our stop. The spindles are of like construction, and each includes a cylindrical base 17 abutting the end face of the screw, an integral saddle 18 extending outwardly from said base, and an integral flange 19 at the outer extremity of said saddle. The flange and saddle each occupy an arc of about 140°, the exact measurement not being critical as long as it is less than 180°. The side of the spindle opposite the saddle and flange has truncations 20 which occupy the remainder of its circumference. As shown in Figure 2, the portion of the saddle adjacent the end of the screw lies below the upper surface of the crossover arm, whereby articles leaving the screws first engage the latter. All the spindles of course are similarly oriented and each is related to the helix of the screw on which it is mounted so that the leading edge of its saddle (with reference to the direction of rotation) catches each article A as it commences to roll down the crossover arms 14 a moment later. The saddle and crossover arms cooperate to form a groove which quickly dampens the tendency of the article to bounce and holds it stationary. As long as the saddles and flanges of our spindles contact the article, they prevent its moving down the crossover arms 14 and they push its left end into engagement with the flange 15. When the screws rotate the spindles to positions where the truncations 20 are adjacent the article, the latter is released to roll or slide down the crossover arms. It is apparent our spindles can be applied equally well to righthand screws, in which event a flange on the right side of the frame functions similarly to flange 15.

In the example of blowing foreign material from pipe bores, an air blowing device, which includes a compressed air tank 21, a nozzle 22, a connecting line 23, and a solenoid valve 24 is situated to the left of frame 10. The nozzle is fixed to flange 15 in a position where it is aligned with the pipe bore as long as the pipe length is held by the spindles. Where pipe lengths are cut in half on the cooling bed, another similar blowing device is situated to the right of the frame. A switch 25 for operating the solenoid to open valve 24 is situated to be engaged by each pipe length while it is held by the spindles. By this arrangement the air blast automatically is applied to each pipe length as it is brought to a stop, and the blast is confined to the bore by virtue of the spindles holding the end of the pipe in engagement with flange 15. Although each pipe length is held only briefly in this position, there is sufficient time for the air blast to accomplish its purpose. When the pipe moves away, it releases switch 25 to cut off the air blast.

From the foregoing description it is seen that our invention affords a simple stop for automatically holding each article briefly as it leaves a screw-type transfer table and then releasing the article. The stop necessitates no additional moving parts and is readily applied to existing installations. It is particularly advantageous in the exemplary application of blowing foreign material from pipe bores, where it enables the blowing operation to be performed automatically while the pipe is motionless.

While we have shown and described only a single embodiment of the invention, it is apparent that modifications may arise. Therefore, we do not wish to be limited to the disclosure set forth but only by the scope of the appended claims.

We claim:

1. The combination, with a screw-type transfer table including a plurality of continuously rotatable screws adapted to carry elongated articles in a transverse direction, and support means adapted to receive articles leaving said screws, of a stop for momentarily arresting movement of each article leaving said screws and comprising a plurality of spindles respectively mounted on the exit ends of selected screws and continuously rotatable therewith, each of said spindles having a saddle occupying a portion of its circumference to receive and hold the article and a truncation opposite the saddle to release the article.

2. The combination, with a screw-type transfer table including a plurality of rotatable screws adapted to carry elongated articles and at least one side flange to prevent longitudinal movement of articles, and support means adapted to receive articles leaving said screws, of a stop for momentarily arresting movement of each article leaving said screws and comprising a plurality of spindles respectively mounted on selected screws, each of said spindles having a base fixed to the end face of the screw, a saddle extending from said base, and a flange at the extremity of said saddle, said saddle and second named flange each occupying an arc of said spindle less than 180° and being adapted to receive and hold the article, each spindle having a truncation occupying the remainder of its circumference adapted to release the article.

3. The combination, with a screw-type transfer table including a plurality of rotatable screws adapted to carry pipe lengths and at least one flange to prevent longitudinal movement of the pipe lengths, support means adapted to receive pipe lengths from said screws, and a device for directing an air blast through the inside of the pipe lengths as they leave said screws, of a stop for momentarily arresting movement of each pipe length while the air blast is directed therethrough comprising a plurality of spindles respectively mounted on the end faces of selected screws and rotatable therewith, each of said spindles having a saddle occupying a portion of its circumference less than 180° to receive and hold the pipe length and a truncation occupying the remainder of its circumference to release the pipe length.

4. A combination as defined in claim 3 including means for automatically operating said device while each pipe length is held by said stop.

5. The combination, with a screw-type transfer table including a plurality of rotatable screws adapted to carry pipe lengths and at least one flange to prevent longitudinal movement of the pipe lengths, support means adapted to receive pipe lengths from said screws, and a device for directing an air blast through the inside of the pipe lengths as they leave said screws and including a nozzle fixed to said flange, of a stop for momentarily arresting movement of each pipe length while the air blast is directed therethrough comprising a plurality of spindles respectively mounted on selected screws, each of said spindles having a base fixed to the end face of the screw, a saddle extending from said base, and a flange at the extremity of said saddle, said saddle and second named flange each occupying an arc of less than 180° and being adapted to receive and hold the pipe length, each spindle having a truncation occupying the remainder of its circumference adapted to release the pipe length.

6. A combintion as defined in claim 5 including means for automatically operating said device while each pipe length is held by said stop.

7. A continuously rotating spindle adapted to serve as an article stop at the end of a screw comprising a base adapted to be fixed to the end face of the screw, a saddle extending from said base, and a flange at the extremity of said saddle, said saddle and flange extending through an arc of less than 180° of the spindle circumference, the remainder of the spindle circumference having at least one truncation.

References Cited in the file of this patent

UNITED STATES PATENTS 2,726,754     Rodder _____ Dec. 13, 1955